Aug. 20, 1929.        H. B. WALTHERS         1,725,117
                       HEADLIGHT CONTROL
                     Filed March 20, 1928       2 Sheets-Sheet 1
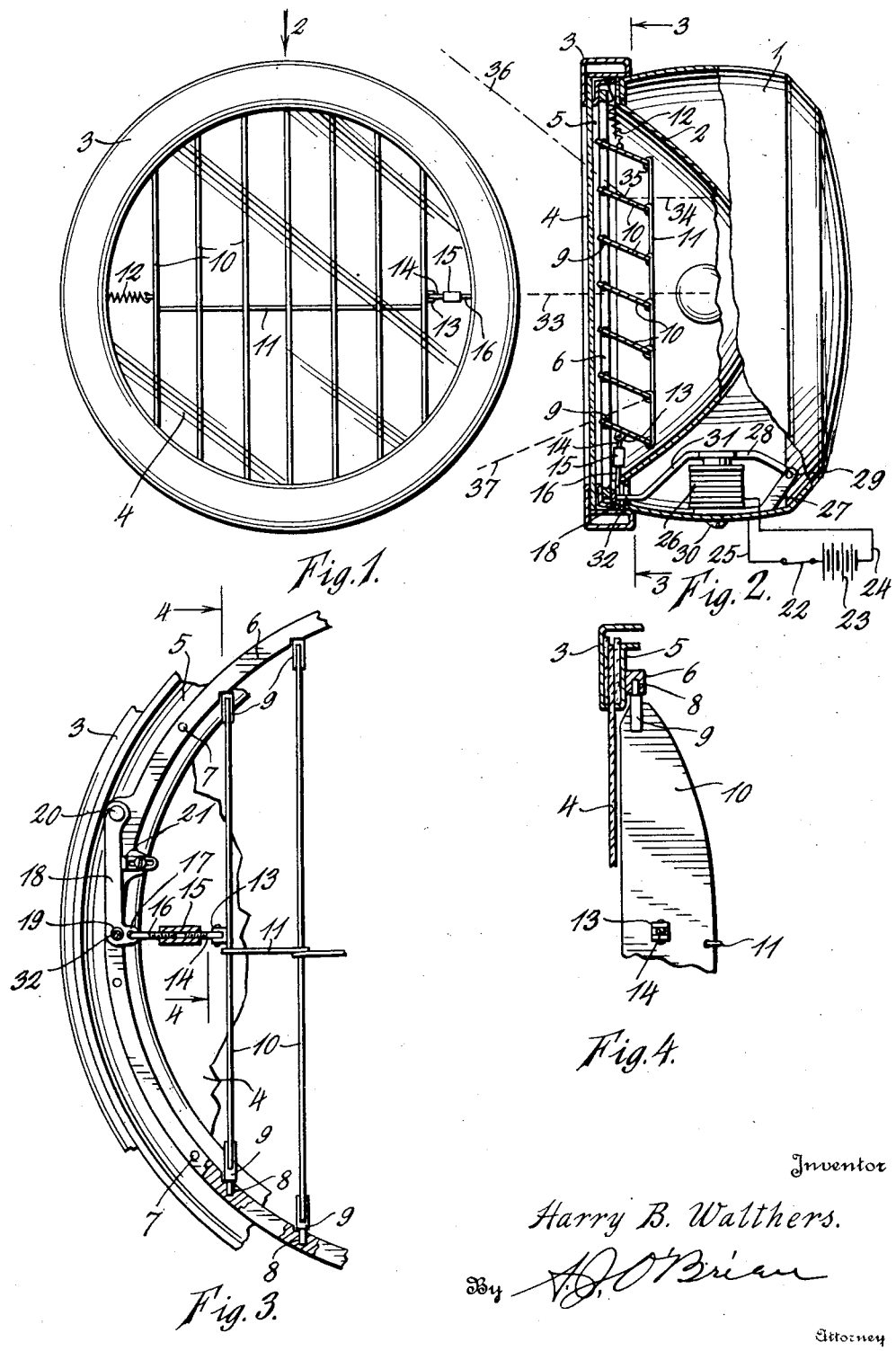
Inventor
Harry B. Walthers.
Attorney Aug. 20, 1929.  H. B. WALTHERS  1,725,117
HEADLIGHT CONTROL
Filed March 20, 1928  2 Sheets-Sheet 2
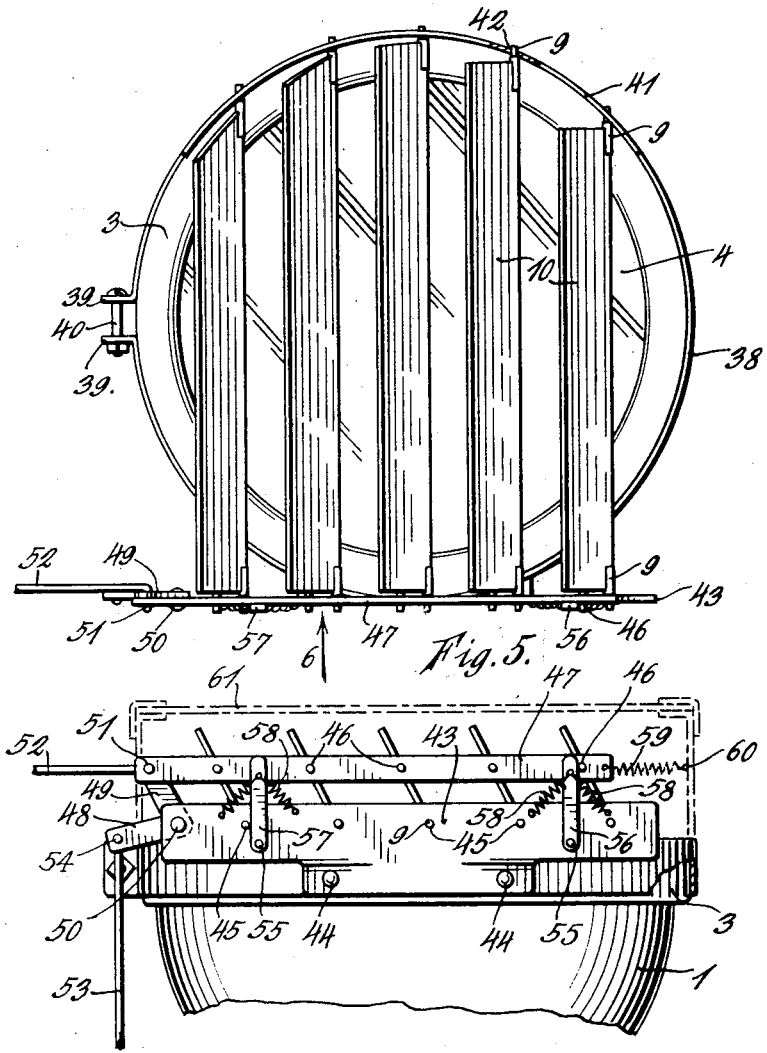
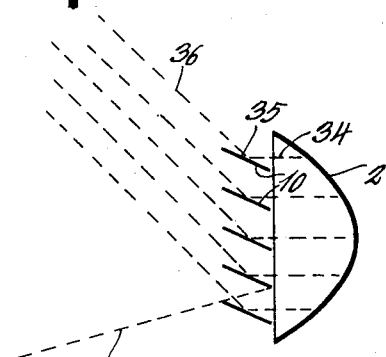
Inventor
Harry B. Walthers.
By H. J. O'Brian
Attorney Patented Aug. 20, 1929.

1,725,117

UNITED STATES PATENT OFFICE.

HARRY B. WALTHERS, OF DENVER, COLORADO.

HEADLIGHT CONTROL.

Application filed March 20, 1928. Serial No. 263,127.

This invention relates to improvements in headlights of the type employed in connection with automobiles.

It is well known that the headlights ordinarily employed for the illumination of the roadways are objectionable for the reason that they always produce a glare that has a tendency to blind the approaching driver and have therefore often been the cause of serious accidents.

It is the object of this invention to produce a headlight which shall be provided with means that will enable the driver of the automobile to shift the direction of the rays of light on meeting another automobile, so as to obviate all danger of blinding the approaching driver by the glare from the automobile lights and at the same time to direct the light towards the right hand side of the road so as to illuminate more clearly this side of the road whereby the danger of running off the roadway or into obstructions is greatly diminished.

My invention briefly described consists in providing a headlight with a plurality of pivotally connected parallel louvers which can be oscillated about parallel vertical axes and which have one side polished so as to reflect the light. These louvers are interconnected so as to move simultaneously to the same extent and are provided with means that normally hold them in such a position that the planes of the louvers are parallel with the optical axis of the reflector and with means controlled by the driver of the automobile which will simultaneously rotate the louvers until their planes intersect the axis of the reflector and hold them in this inclined position with the reflecting surface towards the source of light so that the light emerging from the reflector will strike the reflecting surfaces and be projected at an angle.

Having thus briefly described the invention, I will now proceed to describe the same in detail and for this purpose reference will now be had to the accompanying drawings in which the preferred embodiment has been illustrated and in which:

Fig. 1 is a front view of an automobile headlight equipped with my improved non-glare mechanism;

Fig. 2 is a side elevation of the headlight with portions thereof shown in section, this view being taken looking in the direction of arrow 2 in Fig. 1;

Fig. 3 is a section to a somewhat enlarged scale, taken on line 3—3, Fig. 2, and shows some of the details of the construction;

Fig. 4 is a section taken on line 4—4, Fig. 3;

Fig. 5 is a front view of a modified form of my invention showing the louvers attached to the outside of the headlight lens;

Fig. 6 is a view looking in the direction of arrow 6 in Fig. 5 and shows the operating mechanism employed for the purpose of shifting the louvers, an enclosing casing and an auxiliary lens being shown by dotted lines; and Fig. 7 is a diagrammatic view showing the reflector and the louvers and the manner in which the light rays are reflected.

In the drawing numeral 1 represents a headlight housing of an ordinary construction. The shape and size of this housing is immaterial as far as this invention is concerned, but has merely been illustrated for the purpose of more clearly describing the invention. Numeral 2 represents an ordinary type of reflector which is secured to the housing in an ordinary way and numeral 3 represents a ring by means of which the lens 4 is secured to the open end of the reflector. The exact construction of this ring, like that of the housing, is immaterial, and its construction will therefore not be described in detail. Secured to the inside clamping ring 5 of the lens ring is a circular ring or frame 6, which is held in place by means of screws or rivets 7, and which is provided with a plurality of spaced openings 8 that are located at the ends of parallel chords and in which the trunnions 9 that are secured to the ends of louvers 10 are pivotally mounted. The louvers are preferably connected at their inner edges by means of links 11 and a spring 12 extends from one of the outside louvers to the ring 5 in the manner shown in Figs. 1 and 2. The outside louver on the other side of the headlight is provided with two spaced lugs or ends 13, to which the link 14 is pivotally connected. The end of link 14 is threaded and has associated with it a sleeve 15, which is provided with an opening whose opposite ends are threaded with right and left hand threads. Another link 16 is connected to this sleeve and has the other end provided with a hook 17 that engages in an opening at the free end of lever 18. The free end of this lever is also provided with an opening 19 to which reference will hereinafter be made. Lever 18 is pivoted at 20 and is normally held against an adjustable stop 21. By means of the stop 21 and the turn buckle comprising members 14, 15 and 16, it is possible to adjust the louvers so that their planes will be parallel with the optical axis of the reflector or so as to make any desired angle with this optical axis. The spring 12 tends to hold the lever 18 against the stop 21, and the parts will therefore occupy the position shown in Figs. 1 and 3, when they are in normal position. When the driver meets an approaching car and desires to operate the louvers for the purpose of shifting the direction of the light, he closes a switch which has been indicated by numeral 22 and this permits current from the battery 23 to flow through conductors 24 and 25 to the coil 26 of the electromagnet which is located within the housing 1 between the inner surface of this housing and the reflector in the manner shown in Fig. 2. This coil is secured to a base 27, to which the armature 28 is pivotally connected at 29. A screw 30 serves to hold the electromagnet to the lamp housing. The armature has an inclined portion 31, which terminates in an outwardly extending end portion 32. This end portion extends through the opening 19 in the manner shown in Fig. 3 and therefore when the electromagnet is energized and the armature is moved towards the pole piece of the electromagnet to the position shown in Fig. 2, lever 18 will be rotated about its pivot 20 and by this means the louvers 10 will be moved into the position indicated in Fig. 2 in which position their planes intersect the optical axis 33 at an angle. The rays of light which have been indicated by numeral 34 will then strike the polished surface 35 of the louvers and be reflected so as to emerge in the direction of dotted line 36. Since Fig. 2 is a view looking downwardly onto the headlight, it is evident that when the louvers have been shifted to the position shown in this figure, that the light will be reflected towards the right hand side of the road and will serve to illuminate the edge of the road thereby making it possible for the driver to see clearly any obstructions at the side of the road along which he is driving. The extent of the rotation of louvers 10 can be adjusted by means of the turn buckle and the stop 21 in the manner already pointed out so that the displacement of the light can be adjusted to obtain the best possible conditions for practical operation. When the louvers are in the position shown in Fig. 5, no light can be projected from between the louvers at an angle exceeding that of dotted line 37 and therefore any one approaching the machine and positioned to the left of the machine beyond line 37, will be absolutely protected against every reflected or direct ray from the headlight. By increasing the width of the louvers, the angle made by line 37 can be varied without increasing the angular movement of the louvers and the same effect can also be obtained by increasing or decreasing the angular movement of the louvers which, however, should not be increased to any greater extent than that shown for the reason that the angular displacement of the reflected light is twice that of the angular displacement of the louvers and the movement of the louvers must therefore be restricted to quite narrow limits. It is also possible to increase the number of louvers and thereby obtain the glare protection with a still smaller angular movement of the louvers. The principle employed is the same, regardless of the number of louvers, and the width of the louvers, as well as their number, can be selected so as to obtain the best results.

In Figs. 5 and 6 I have shown a modified form of construction in which the louvers are located on the outside of the headlight. In this construction I employ a ring 38, whose ends 39 are bent outwardly and connected by means of a bolt 40. This ring has an internal diameter such that it will fit on the outside of the lens ring 3 and after it has been put in place, it can be firmly clamped by tightening bolt 40. The upper edge of this ring extends forwardly in the manner indicated by numeral 41 and this forwardly extending flange is provided with spaced openings 42 for the reception of the trunnions 9 of the louvers. Secured to the lower side of the ring is a flat bar 43, that is held in place by means of rivets 44. This bar has spaced openings 45 in which are rotatably mounted the trunnions 9 on the lower end of the louvers. The louvers can therefore be rotated about parallel spaced axes in the same manner as shown and described in connection with the embodiments shown in Figs. 1 to 4. The lower ends of the louvers are provided with downwardly extending pins 46, which project through spaced openings in the bar 47. A bell crank having arms 48 and 49 is pivoted at 50 to one end of the bar 43. The free end of arm 49 is pivoted to bar 47 at 51 and from this point a rod 52 extends to the corresponding bar of the other headlight. A wire 53 is connected at 54 to the free end of arm 48 and this wire can extend to the dashboard so as to be within easy reach of the driver. Pivotally secured to the bar 43 at points 55 are stops 56 and 57. These stops are normally held in a position vertical with respect to bar 43 by means of springs 58. When the louvers are rotated about their axes through the medium of the operating member 53, one of the downwardly extending pins 46 engages one of the stops 56 so as to limit their movement. It is apparent from the drawing that the stop 56 will limit the movement in one direction, while the corresponding stop 57 will serve to limit the movement in the opposite direction. If desired, a spring 59 can be secured to one end of bar 57 and anchored at 60 and this spring can be tensioned so as to return the bar 47 to such a position that the louvers will lie in planes parallel with the optical axis of the reflector. In order to protect the louvers against dust and dirt, they may be enclosed in a casing which has been indicated by dotted lines in Fig. 6 and in which that part represented by numeral 61 designates a transparent lens through which the light may pass.

In Fig. 7 I have illustrated in a diagrammatic way the reflector 2 and the louvers, showing the latter in rotated position so that the light rays 34 which have been supposed to emerge in parallel relation from the reflecting surface of the reflector will be projected in the direction indicated by lines 36.

I want to call attention to the fact that the surface 35 of the louvers is a reflecting surface, while the other surface may be dull or may be reflecting as the condition of the opposite side is immaterial. It is, however, essential for the best operation that surface 35 shall be highly polished so as to reflect all the rays of light that impinge on it. By having the other surface of the louvers dull, there will be no danger of reflected rays from any outside source causing any glare to other drivers or to pedestrians.

From the above description it will be apparent that I have produced a very simple mechanism by means of which the driver of an automobile by merely pressing a button or pulling a wire can deflect the lights of his headlight towards the right of the road and at the same time interpose a shield between the headlight and an approaching driver so as to prevent any rays from the headlight from producing a blinding glare.

This invention can be so constructed that it can readily be applied to any ordinary headlight and can therefore be sold as an accessory and can even be secured to the outside of the headlight in the manner shown in Figs. 5 and 6. I want to call particular attention to the fact that the louvers are made of opaque material and have one surface polished so that they will efficiently reflect the light. If the louvers did not have the polished surfaces to which I have referred, they would not serve the purpose intended as the light could then not be effectively directed towards the right hand side of the road.

Although the louvers are preferably constructed of opaque material, it is, however, possible to make them of translucent material, which, however, must have a highly polished surface so that the greater part of the light will be reflected, it is, however, the best practice to construct them of opaque material in the manner indicated.

In the above description the louvers have been described as lying in parallel planes and as being simultaneously rotated through equal angles; this is the preferred construction.

It is sometimes desirable to so arrange the louvers that they will make different angles with the axis of the reflector as by this means the distribution of the light can be varied.

It is evident that by polishing one side of the louvers a greater percentage of the light will be reflected, but it is possible and sometimes preferable to employ unpolished louvers and even unreflecting surfaces.

There may obviously be specifically different means for securing the louvers to the reflector and among other modifications, the louvers may be pivotally secured to a pair of spaced parallel bars whose ends may be attached to the reflector near its outer edge.

This application is a continuation in part of Serial No. 208,500, filed July 26, 1927.

Having described my invention, what I claim as new is:

1. A headlight control means comprising a ring, a plurality of louvers having their opposite ends pivotally connected to the ring, the axes of rotation of the louvers forming a plurality of parallel chords, means for interconnecting corresponding edges of said louvers so that they will rotate simultaneously, means comprising a spring for imparting to the louvers a force tending to rotate them in one direction, a lever having one end pivoted to the ring, an adjustable connection between the end of the lever and one of the louvers, a stop for limiting the movement of the lever in one direction and means comprising an electromagnet for moving the lever away from its stop.

2. A headlight control means comprising a ring, a plurality of louvers having their opposite ends pivotally connected to the ring, the axes of rotation of the louvers forming a plurality of parallel chords, means for interconnecting corresponding edges of said louvers so that they will rotate simultaneously, means comprising a spring for imparting to the louvers a force tending to rotate them in one direction, a lever having one end pivoted to the ring, an adjustable connection between the end of the lever and one of the louvers, an adjustable stop for limiting the movement of the lever in one direction and means comprising an electromagnet for moving the lever away from its stop.

In testimony whereof I affix my signature.

HARRY B. WALTHERS.